B. W. SCOTT.
APPARATUS FOR FORMING CAPSULES.
APPLICATION FILED SEPT. 25, 1908.
943,608.
Patented Dec. 14, 1909.
5 SHEETS—SHEET 1.
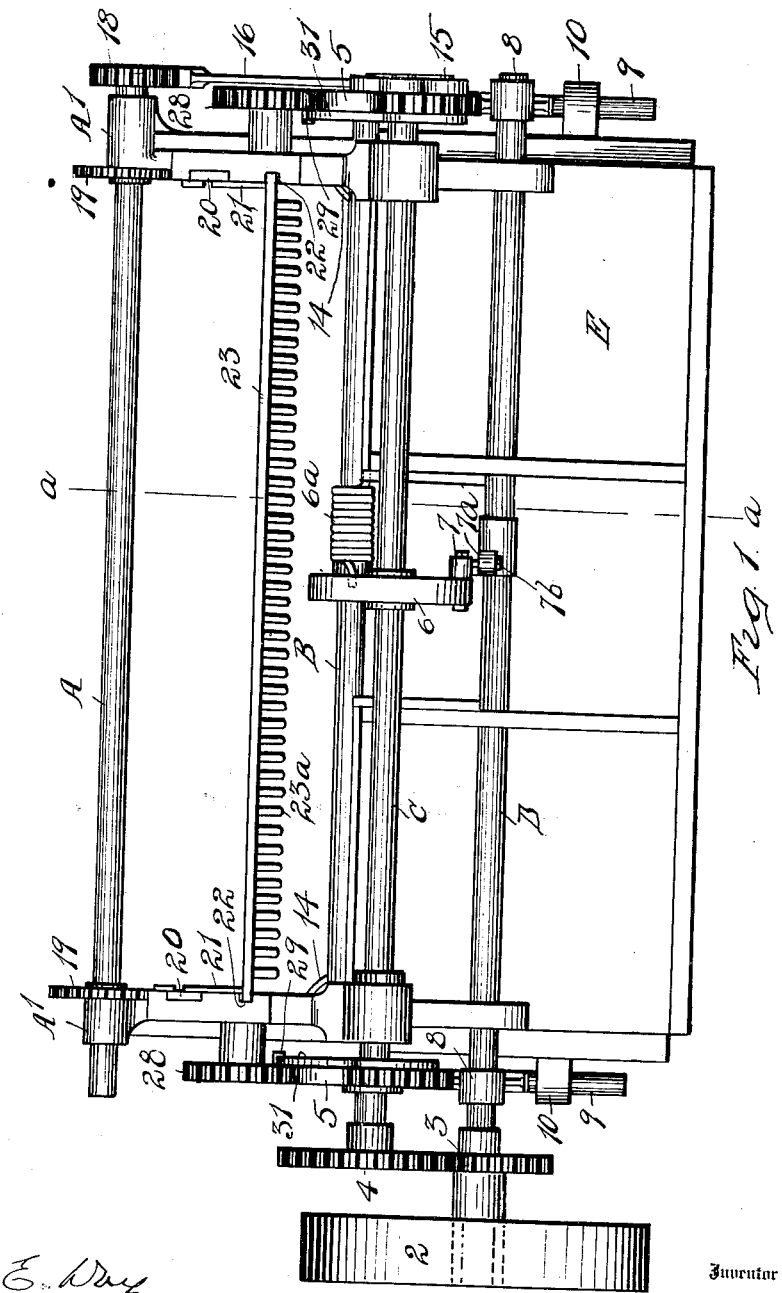
Witnesses
Clarence E. Day
Alecia Townsend
Inventor
Burton W. Scott
Parker & Burton
Attorneys

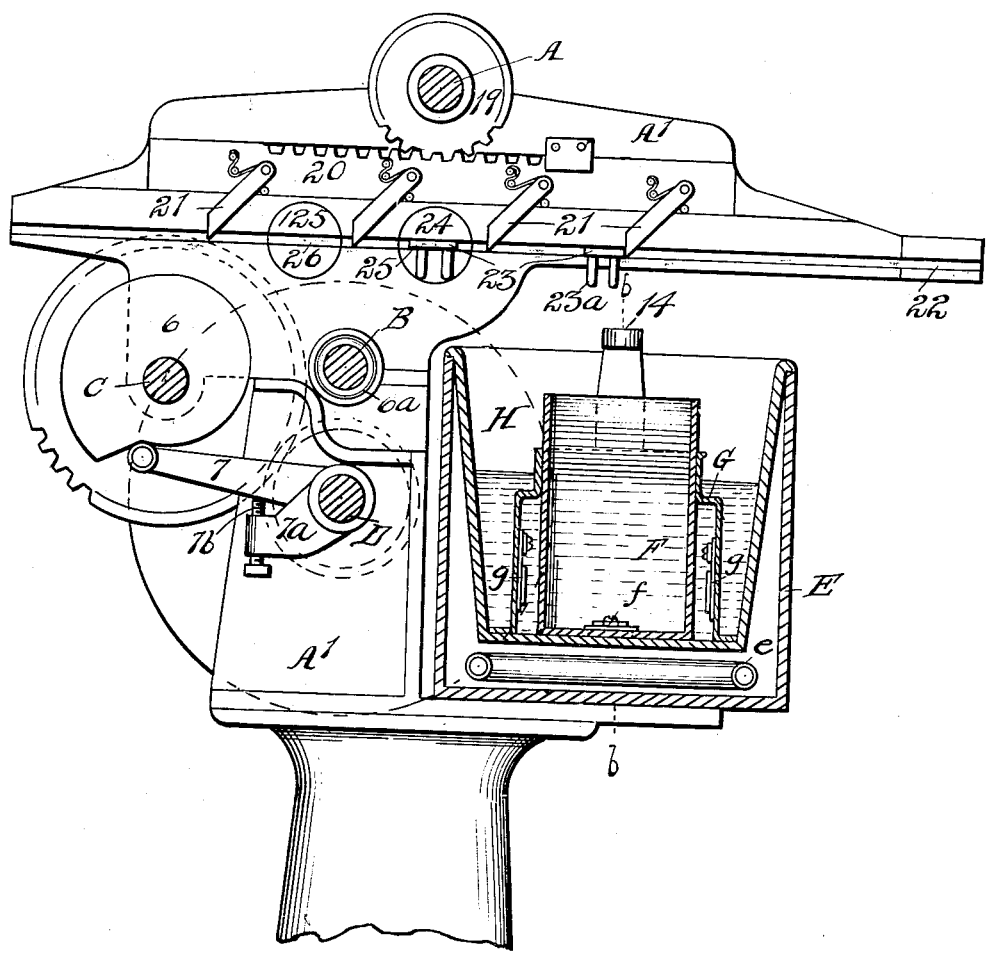

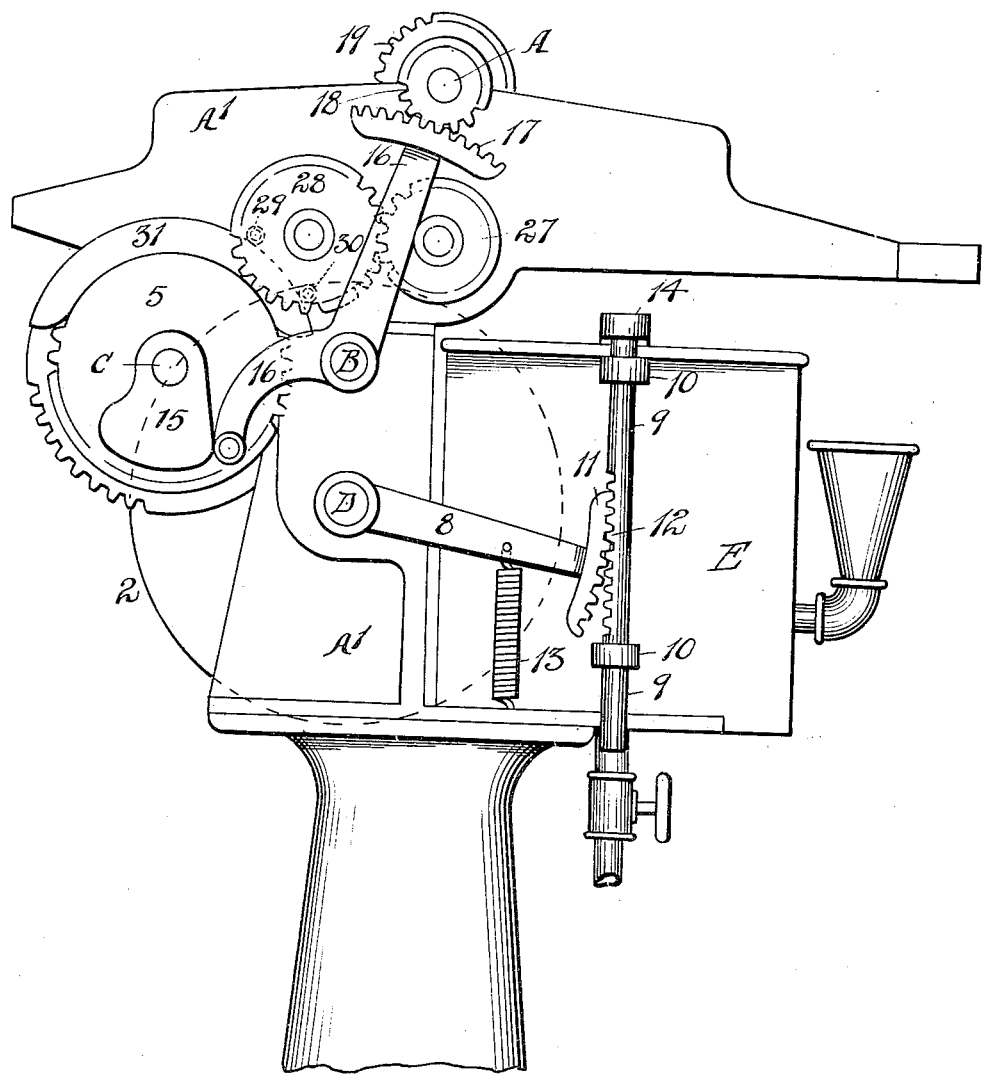

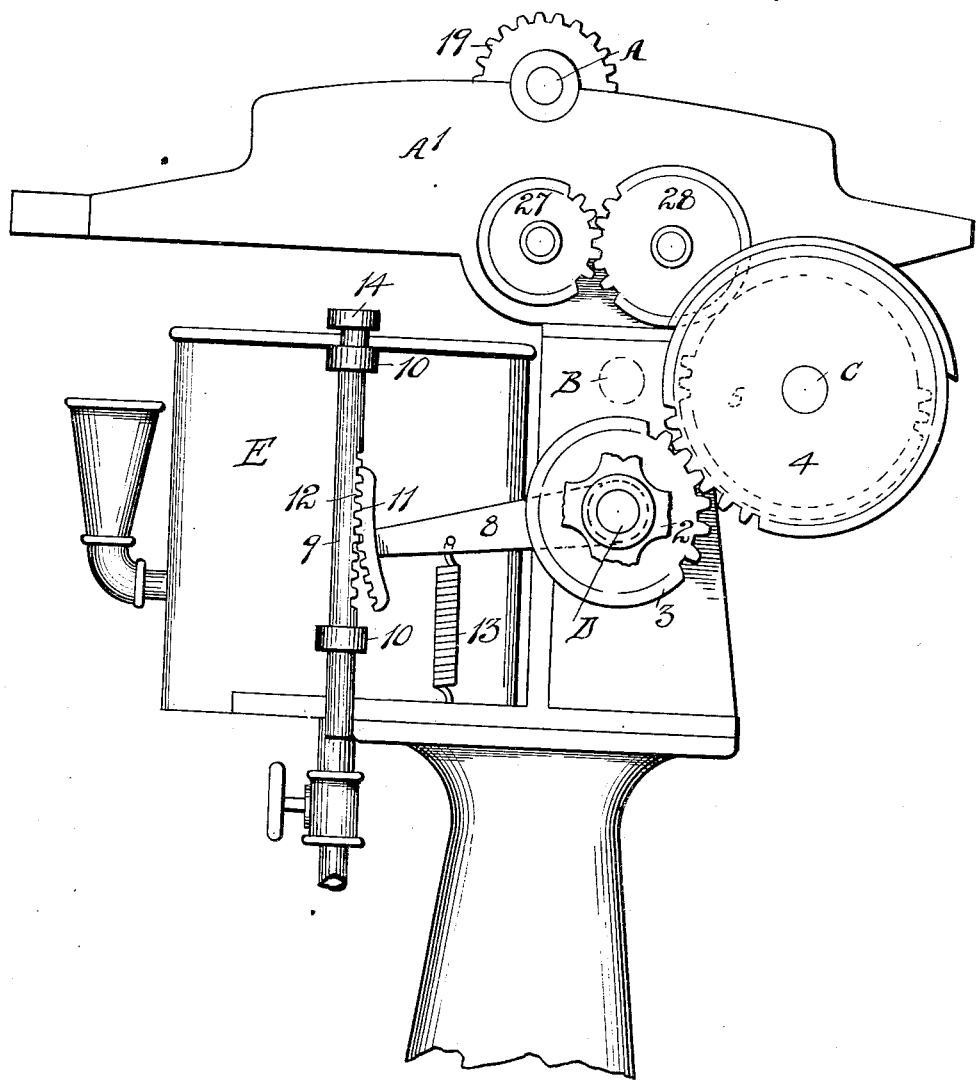

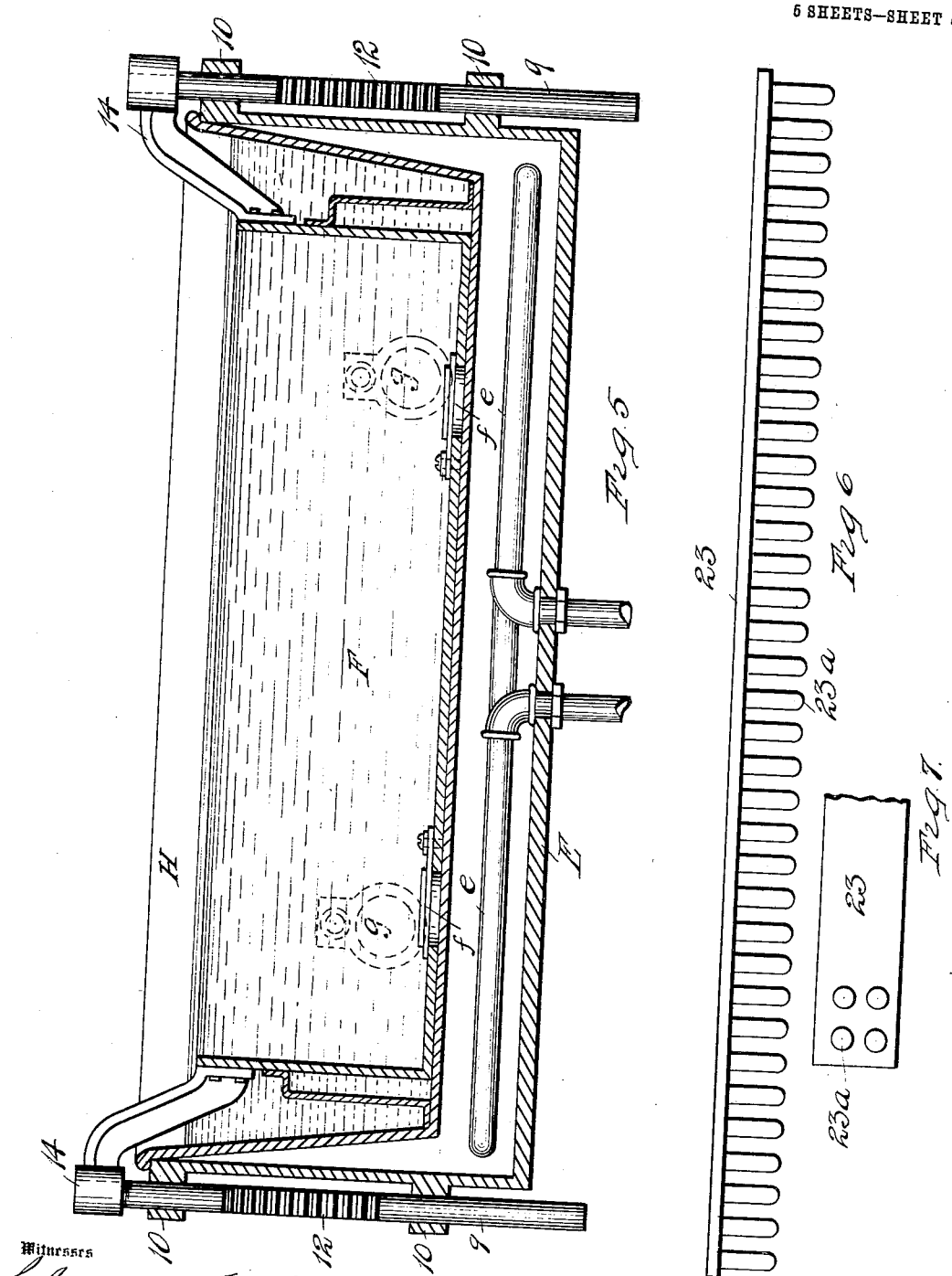

UNITED STATES PATENT OFFICE.

BURTON W. SCOTT, OF DETROIT, MICHIGAN, ASSIGNOR TO ARTHUR COLTON COMPANY, OF DETROIT, MICHIGAN, A CORPORATION OF MICHIGAN.

APPARATUS FOR FORMING CAPSULES.

943,608.

Specification of Letters Patent. Patented Dec. 14, 1909.

Application filed September 25, 1908. Serial No. 454,731.

*To all whom it may concern:*

Be it known that I, BURTON W. SCOTT, a citizen of the United States, residing at Detroit, county of Wayne, State of Michigan, have invented a certain new and useful Improvement in Apparatus for Forming Capsules, and declare the following to be a full, clear, and exact description of the same, such as will enable others skilled in the art to which it pertains to make and use the same, reference being had to the accompanying drawings, which form a part of this specification.

My invention relates to capsule dipping machines, and an object of my improvements is to provide an improved apparatus, whereby the gelatin is kept in a homogeneous condition, the forming pins immersed therein, and the adhering gelatin caused to set uniformly around the pins. I accomplish this object by the device illustrated in the accompanying drawings, in which:—

Figure 1, is a front view of an apparatus embodying my invention. Fig. 2, is a section on the line $a$—$a$ Fig. 1, looking toward the right of said figure. Fig. 3, is an elevation looking from the right of Fig. 1. Fig. 4, is an elevation looking from the left of Fig. 1. Fig. 5, is a section on the line, $b$—$b$ Fig. 2. Fig. 6, is an elevation of the bar upon which are the pins on which the capsule is formed. Fig. 7, is a plan view of a portion of the part shown in Fig. 4.

$A^1$ is a framework, upon which rest in bearings, the shafts A, B, C, D.

2 is a pulley adapted to turn upon the shaft D.

3 is a gear wheel united by a sleeve to the pulley 2, and adapted to turn therewith upon the shaft D.

4 is a gear wheel upon the shaft C, its teeth engaging with the teeth of the gear wheel 3, so that the motion of rotation of the latter shall cause the shaft C to rotate.

5, 5, are gear wheels located toward the ends of the shaft C, which have gear teeth only part way around their peripheries and are smooth for the remainder of their peripheries.

6 is a cam upon the shaft C.

7 is a lever arm secured to the shaft D and adjustable angularly thereon, by means of the fixed arm $7^a$, and adjusting screw $7^b$ (Fig. 2). The cam 6 acts to rock the shaft D through the lever arm 7.

8, 8, are lower arms toward the ends of the shaft D, having segments 11 at their outer ends which have gear teeth at their peripheries, which engage racks 12 on rods 9, which are adapted to reciprocate vertically through guides 10, 10 (Figs. 3 and 4).

13 is a spring acting to retract the arms 8.

E is a trough containing heating pipes $e$. In the trough E is placed a receptacle H, which acts as a reservoir for the gelatin. In the receptacle H is placed a casing inclosed, except at the top, where it is left open to form a mouth for the reception of a hollow plunger F, which is inclosed except at its upper end. The plunger F is adapted to fit and reciprocate in the mouth of the casing G.

$g$, $g$, are valves opening inward in the sides of the casing G.

$f$, $f$, are inwardly opening valves in the bottom of the plunger F.

14, 14, are hangers (Fig. 5) connecting the plunger F with the rods 9 at the upper ends of the latter.

When the shaft D is rocked, a reciprocating motion is thereby imparted to the rods 9 through the lever arms 8, and the two segments at their ends acting through the racks 12 on the rods 9; thus the plunger F is raised and lowered by means of the hangers 14. When the plunger F is raised, there is a tendency to form a vacuum in the casing G beneath said plunger, and the gelatin flows in through said valves $g$. When the plunger is again lowered, the gelatin from the casing G ascends through the valves $f$, $f$, and runs over the top edges of the plunger F. Thus the gelatin is continually drawn from the lower portion of the reservoir H and forced up to the surface, so that a film is not formed at the surface of the gelatin, and there is no tendency to form bubbles.

When the plunger F is raised to its highest position, the gelatin is brought above the level of the lower ends of pins $23^a$, depending from rods 23, which are located just above the plunger F, as indicated in Fig. 2, so that the pins will be immersed in the gelatin and it will adhere to said pins.

Rods 23 are automatically, successively, passed into position over the plunger F, and removed from this position and rotated so as to secure a uniform layer of gelatin as the same sets around the pins, in a manner and by apparatus now to be described.

15 (Figs. 1 and 3) is a cam on the end of the shaft C.

16 is a lever arm secured upon the shaft B, and adapted to be rocked by the cam 15.

6ᵃ (Fig. 1) is a spring adapted to restore the shaft B to its original position when it has been turned therefrom by the cam 15.

The lever 16 has a geared segment 17 on its upper end, which segment meshes with a gear wheel 18 on the end of the shaft A.

19, 19, are gear wheels upon the shaft A, toward the ends of said shaft.

20, 20, are racks adapted to reciprocate in horizontal guide-ways in the frame A¹. The gear wheels 19 have their teeth engaging the teeth of the racks 20 (Fig. 2).

22, 22, are horizontal guide-ways in the frame A¹, just below and parallel to the guide-ways in which the racks 20 reciprocate. The guide-ways 22, 22, are adapted to receive the ends of the rods 23, which slide along therein lying transversely across from one guide to the other.

21 are pawls upon the racks 20, adapted to engage the bars 23, and force them along in a step by step motion. The cam 15 acting upon the arm of the lever 16, rocks said lever, oscillating the shaft A through the sector 17, and gear wheel 18, and reciprocating the racks 20, so that the pawls 21 successively engage bars 23, and force them into their proper position.

24, 25 (Fig. 2) are cylinders, or short arbors adapted to rotate in bearings in the frame A¹. There are two pairs of cylinders 24, 25, opposite each other, only one pair of which are shown and described, as the others correspond completely to these and are located opposite the first pair at the other end of the frame.

125, 26, are diametral slots in the arbors 24, 25, which are adapted to register, and form a continuation of the slots 22.

27, 28, are gear wheels upon the shafts 25, 24, on the outside of the frame, the teeth of which engage with each other. The teeth of the gear wheels 5 are adapted to engage the teeth of the gear wheels 28, and intermittently rotate said gear wheels.

29 and 30 are pins extending from the gear wheels 28.

31 is a cam upon the gear wheel 5. The cam 31 engages the pins 29 and 30, to hold the gear wheels 28 and 27 exactly in position, so that the diametral slots 125 and 26 shall be in line with the guides 22, except when the gear wheels 28 and 27 are being rotated.

The bars 23 are placed with their ends in the slot 22 by hand, or otherwise, in position to be operated upon by the dogs 21. The machine in its operation reciprocates the racks 20, forcing a bar first into position over the plunger F, which is then raised, coating the pins 23ᵃ on said bar with gelatin. This bar is then again forced along another step, and into the diametral slot 125 in the shaft 24, and is rotated therein, so that the gelatin shall form evenly over the surface of the pins. The bar is then passed along into the slot 26, and is given a second rotation to assist the drying and even setting of the gelatin. It is then passed along for further operations not within the scope of this specification.

What I claim is:—

1. In an apparatus of the kind described, the combination of a plunger adapted to contain gelatin, so constructed that an excess of gelatin shall pass therefrom, means for reciprocating said plunger, a pin for forming the capsule located above said plunger, said plunger being adapted to be raised until said pin is immersed in the gelatin therein, and means whereby the reciprocation of said plunger acts to force gelatin thereinto.

2. In an apparatus of the kind described, the combination of a plunger adapted to contain gelatin, so constructed that an excess of gelatin shall pass therefrom, means for reciprocating said plunger, a pin for forming the capsule located above said plunger, said plunger being adapted to be raised until said pin is immersed in the gelatin therein, and means whereby the reciprocation of said plunger acts to force gelatin thereinto beneath the surface of the gelatin in said plunger.

3. The combination of a reservoir of gelatin, a plunger adapted to contain gelatin, and means for reciprocating said plunger in said reservoir, said plunger being provided with an inwardly opening valve adapted to permit the entrance of gelatin into said plunger, a pin for forming the capsule located above said plunger, said plunger being adapted to be raised until said pin is immersed in the gelatin therein.

4. The combination of a reservoir of gelatin, a casing G, therein, an inwardly opening valve in said casing, a plunger adapted to fit and reciprocate in the mouth of said casing, an inwardly opening valve in said plunger, a pin for forming the capsule located above said plunger, said plunger being adapted to be raised until said pin is immersed in the gelatin therein.

5. The combination of a reservoir of gelatin, a plunger adapted to reciprocate vertically therein, means for reciprocating said plunger, bars having forming pins therein adapted to slide in ways above said plunger, means for giving said bars an intermittent step by step motion, said plunger being adapted to rise so that the pins on said bars shall be immersed in the gelatin therein at one position of said bars, and means for rotating said bars after they have passed over said plunger.

6. The combination of a plunger F, a rock shaft D, an arm extending from said rock shaft and connecting with said plunger to reciprocate the same, a shaft C, means for continuously rotating said shaft, means on the shaft C adapted to rock the shaft D, gear wheels 28 having parts attached thereto adapted to receive and rotate the bars 23, and mutilated gear wheels 5 on the shaft C adapted to intermittently rotate the gear wheels 28, for the purpose described.

7. The combination of a plunger F, a rock shaft D, an arm extending from said rock shaft and connecting with said plunger to reciprocate the same, a shaft C, means for continuously rotating said shaft, means on the shaft C adapted to rock the shaft D, gear wheels 28 having parts attached thereto adapted to receive and rotate the bars 23, mutilated gear wheels 5 on the shaft C adapted to intermittently rotate the gear wheels 28, lugs on the wheels 28, and cams upon the wheels 5 adapted to engage said lugs to hold the wheels 28 stationary during a part of the revolution of the wheels 5, substantially as and for the purpose described.

8. The combination of a plunger F, a rock shaft D, an arm extending from said rock shaft and connecting with said plunger to reciprocate the same, a shaft C, means for continuously rotating said shaft, means on the shaft C adapted to rock the shaft D, gear wheels 28 having parts attached thereto adapted to receive and rotate the bars 23, mutilated gear wheels 5 on the shaft C adapted to intermittently rotate the gear wheels 28, reciprocating parts 20 having pawls adapted to engage the bars 23, and means forming a communication between the shaft C and the parts 20 whereby the latter are reciprocated.

9. The combination of a plunger F, a rock shaft D, an arm extending from said rock shaft and connecting with said plunger to reciprocate the same, a shaft C, means for continuously rotating said shaft, means on the shaft C adapted to rock the shaft D, gear wheels 28 having parts attached thereto adapted to receive and rotate the bars 23, mutilated gear wheels 5 on the shaft C adapted to intermittently rotate the gear wheels 28 lugs on the wheels 28, cams upon the wheels 5 adapted to engage said lugs to hold the wheels 28 stationary during a part of the revolution of the wheels 5, the parts 20 adapted to reciprocate in grooves in the frame parallel to said parts adapted to receive the bars 23, pawls extending from said reciprocating parts, and means connecting the shaft C with the parts 20 so that the rotation of the shaft C shall reciprocate the parts 20, substantially as and for the purpose described.

In testimony whereof, I sign this specification in the presence of two witnesses.

BURTON W. SCOTT.

Witnesses:
ALECEA TOWNSEND,
ELLIOTT J. STODDARD.